US009654152B2

(12) United States Patent
Colella et al.

(10) Patent No.: US 9,654,152 B2
(45) Date of Patent: May 16, 2017

(54) SERVICE PROVIDER ADAPTIVE VEHICLE ANTENNA

(71) Applicant: Ford Global Technologies, LLC, Dearborn, MI (US)

(72) Inventors: Nicholas Colella, Grosse Ile, MI (US); Allen R. Murray, Lake Orion, MI (US); Tuan Anh Be, Livonia, MI (US); Leo James Lanctot, Jr., South Lyon, MI (US); David Richard Tengler, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 14/635,370

(22) Filed: Mar. 2, 2015

(65) Prior Publication Data

US 2016/0261291 A1 Sep. 8, 2016

(51) Int. Cl.

| | |
|---|---|
| ***H04B 13/02*** | (2006.01) |
| ***H04B 1/00*** | (2006.01) |
| ***H04B 1/3822*** | (2015.01) |
| ***H04B 1/04*** | (2006.01) |
| ***H04B 1/18*** | (2006.01) |
| *H04B 17/382* | (2015.01) |
| *H04W 48/18* | (2009.01) |
| *H04W 88/04* | (2009.01) |

(52) U.S. Cl.

CPC ......... *H04B 1/0064* (2013.01); *H04B 1/0458* (2013.01); *H04B 1/18* (2013.01); *H04B 1/3822* (2013.01); *H04B 17/382* (2015.01); *H04W 48/18* (2013.01); *H04W 88/04* (2013.01)

(58) Field of Classification Search

CPC .................................. H04B 1/40; H04B 3/23

USPC .......................................................... 375/219

See application file for complete search history.

(56) References Cited

U.S. PATENT DOCUMENTS

| | | | | |
|---|---|---|---|---|
| 3,098,231 | A | 7/1963 | St. Vrain et al. | |
| 5,261,117 | A * | 11/1993 | Olson | 455/510 |
| 5,761,621 | A * | 6/1998 | Sainton | 455/453 |
| 6,697,030 | B2 * | 2/2004 | Gleener | H01Q 9/14 343/745 |
| 8,294,632 | B2 * | 10/2012 | Skarp | H04B 1/0458 333/17.3 |
| 8,766,870 | B2 | 7/2014 | Jung et al. | |
| 2005/0062667 | A1 | 3/2005 | Shirosaka et al. | |
| 2007/0049213 | A1 | 3/2007 | Tran | |
| 2010/0234071 | A1 * | 9/2010 | Shabtay et al. | 455/562.1 |

(Continued)

*Primary Examiner* — Helene Tayong

(74) *Attorney, Agent, or Firm* — Jennifer M. Stec; Brooks Kushman P.C.

(57) ABSTRACT

A vehicle may include a plurality of antennas each associated with a different radio frequency; and a modem including a radio-frequency transceiver and an antenna control processor configured to selectively connect a selected one or more of the plurality of antennas having a radio frequency matching at least one frequency associated with a desired service provider to the transceiver. The vehicle may also determine whether a service-provider-recommended alternate frequency is available, responsive to service provider signal strength being below a predefined signal strength; and if so, direct the modem to switch to an antenna associated with the alternate frequency, and otherwise, cycle to a next available antenna frequency.

15 Claims, 11 Drawing Sheets

800

START

802 Service Provider Signal Below Threshold Strength?

NO / YES

804 Service Provider Recommendation Available?

NO / YES

806 Switch to Antenna Recommended by Service Provider

808 Search Antennas for Available Signal from Approved Provider

810 Wireless Connection Established?

NO / YES

(56) References Cited

U.S. PATENT DOCUMENTS

| | | | | |
|---|---|---|---|---|
| 2014/0010171 | A1* | 1/2014 | Morrill et al. | 370/329 |
| 2014/0087668 | A1 | 3/2014 | Mow et al. | |
| 2014/0159986 | A1* | 6/2014 | De Luis et al. | 343/852 |
| 2014/0378098 | A1* | 12/2014 | Trocke et al. | 455/411 |

* cited by examiner

SERVICE PROVIDER ADAPTIVE VEHICLE ANTENNA

TECHNICAL FIELD

Aspects of the disclosure generally relate to adaptive vehicle antennas for use with communications services providers.

BACKGROUND

Vehicle telematics units may be utilized to allow a user of a vehicle to interact with services available over a communications network. To facilitate the communication, the vehicle may include a modem connected to a fixed passive antenna communicating at frequencies appropriate for a service provider supporting the services. The vehicle antenna may receive energy from the service provider with acceptable efficiency across a manufacturer-selected range of frequencies and bandwidth.

SUMMARY

In a first illustrative embodiment, a vehicle includes a plurality of antennas each associated with a different radio frequency; and a modem including a radio-frequency transceiver and an antenna control processor configured to selectively connect a selected one or more of the plurality of antennas having a radio frequency matching at least one frequency associated with a desired service provider to the transceiver.

In a second illustrative embodiment, a vehicle includes a modem having a plurality of antennas each associated with a different radio frequency; and a processor configured to determine whether a service-provider-recommended alternate frequency is available, responsive to service provider signal strength being below a predefined signal strength; and if so, direct the modem to switch to an antenna associated with the alternate frequency, and otherwise, cycle to a next available antenna frequency.

In a third illustrative embodiment, a computer-implemented method includes determining a frequency associated with a desired service provider for in-vehicle modem communication via at least one selected antenna of a plurality of antennas each associated with a different radio frequency, the vehicle including a radio-frequency transceiver and an antenna control processor; and sending an antenna selection message to the antenna control processor to connect the selected antenna(s) to the radio-frequency transceiver.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Different frequency bands may be utilized by different broadcast service providers. In many examples, a vehicle may be delivered with an antenna suitable for use with a service provider initially configured to support the vehicle. Over time or when changing location, a vehicle owner may wish to change mobile wireless service providers. However, as a fixed passive antenna included in the vehicle may be incapable of receiving on different frequency bands, the vehicle owner may be limited to a particular service provider and service due to provider incompatibility with the antenna system. Moreover, as wireless technology continues to advance, new and different frequency bands may come into use. However, these new bands may also be unable to be received with acceptable efficiency by the vehicle antenna.

An improved antenna system for a vehicle may utilize multiple antennas, each with different reception characteristics, and a radio-frequency (R/F) switching system configured to select on demand a desired antenna from the multiple antennas to cover the desired bandwidth. In an example, the antenna system may be configured to allow the vehicle to be automatically be tuned to the correct antenna or antennas for the current service provider signed up for by the vehicle owner. For instance, the system may identify the service provider according to the user's mobile device, and may automatically switch to an appropriate antenna to receive service for that service provider.

The antenna system may be further configured to identify which antenna to utilize according to vehicle location. For instance, service providers may have peering or roaming agreements with other networks, such that when users are outside of a home area where the service provider has coverage, those other networks may be used by the customer instead. In many cases those alternate networks operate at different frequencies than those of the user's service provider. In an example, a service provider may send a recommended antenna selection to a roaming vehicle to cause the vehicle to reconnect at a different frequency or frequencies. Further aspects of the antenna system are discussed in detail below.

Figure 1:
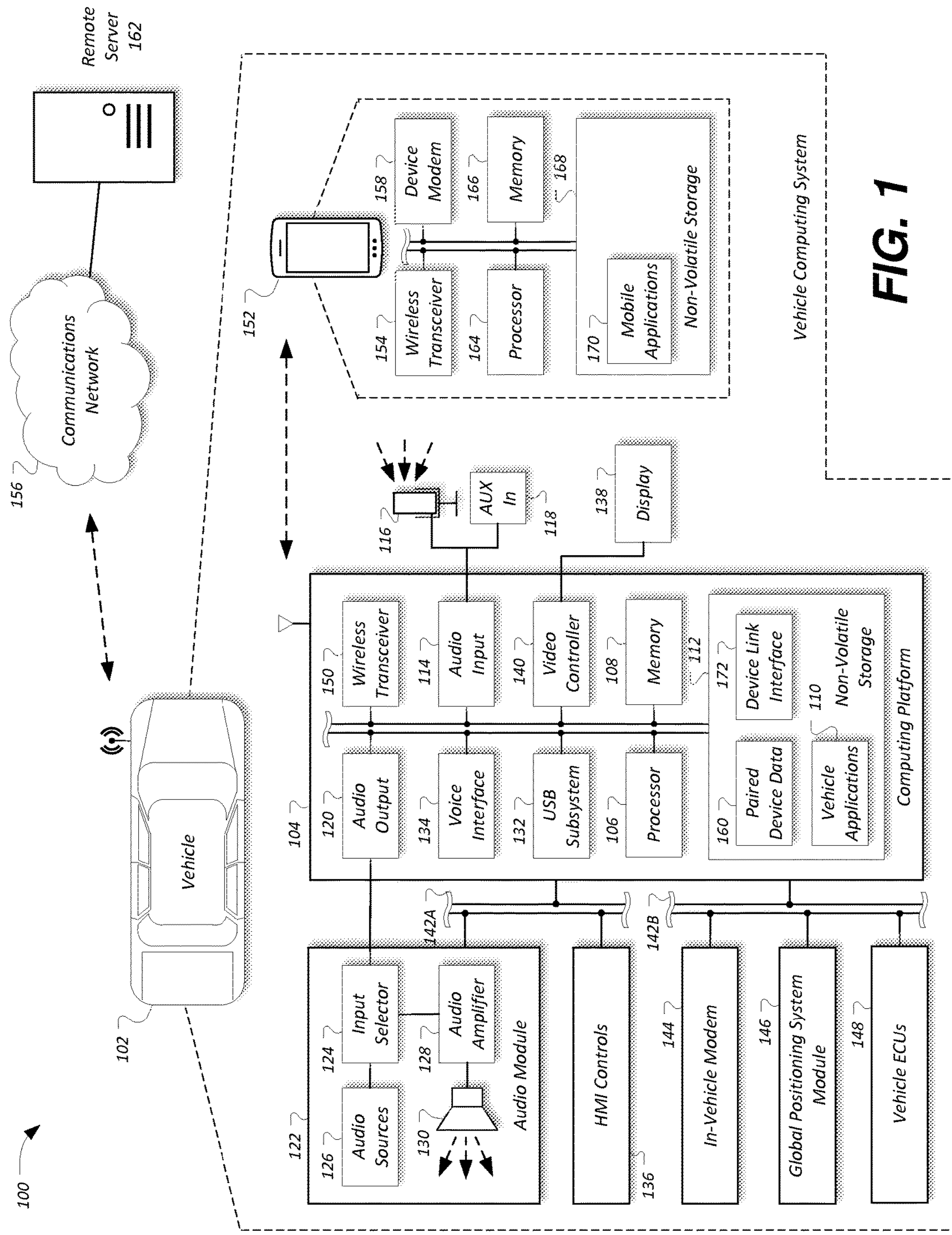
FIG. 1 illustrates an example diagram of a system that may be used to provide telematics services to a vehicle.

FIG. 1 illustrates an example diagram of a system 100 that may be used to provide telematics services to a vehicle 102.

The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headsets (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, ambient temperature sensor information, heating and cooling temperature settings for one or more vehicle zones, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as mobile smartphones or other cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

The communications network 156 may be managed by a wireless service provider. For instance, to be granted access the communications network 156 the device may be required to be registered with a user account of the service provider. The service provider may accordingly bill the registered device for access and/or usage of communications services (e.g., data, voice, messaging, etc.) via the communications network 156. Service providers may utilize different frequencies of operation to support communications services of the connected devices. In an example, a first service provider may provide communications services via 750 megahertz (MHz), 1700 MHz and 2100 MHz bands, and a second service provider may provide communications services via 800 MHz, 1900 MHz and 2500 MHz bands.

When a mobile device 152 that supports network connectivity is paired with the computing platform 104, the mobile device 152 may allow the computing platform 104 to use the network connectivity of the device modem 158 to communicate over the communications network 156 with the remote telematics services 162 or other networked devices. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interface 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif.

Figure 2:
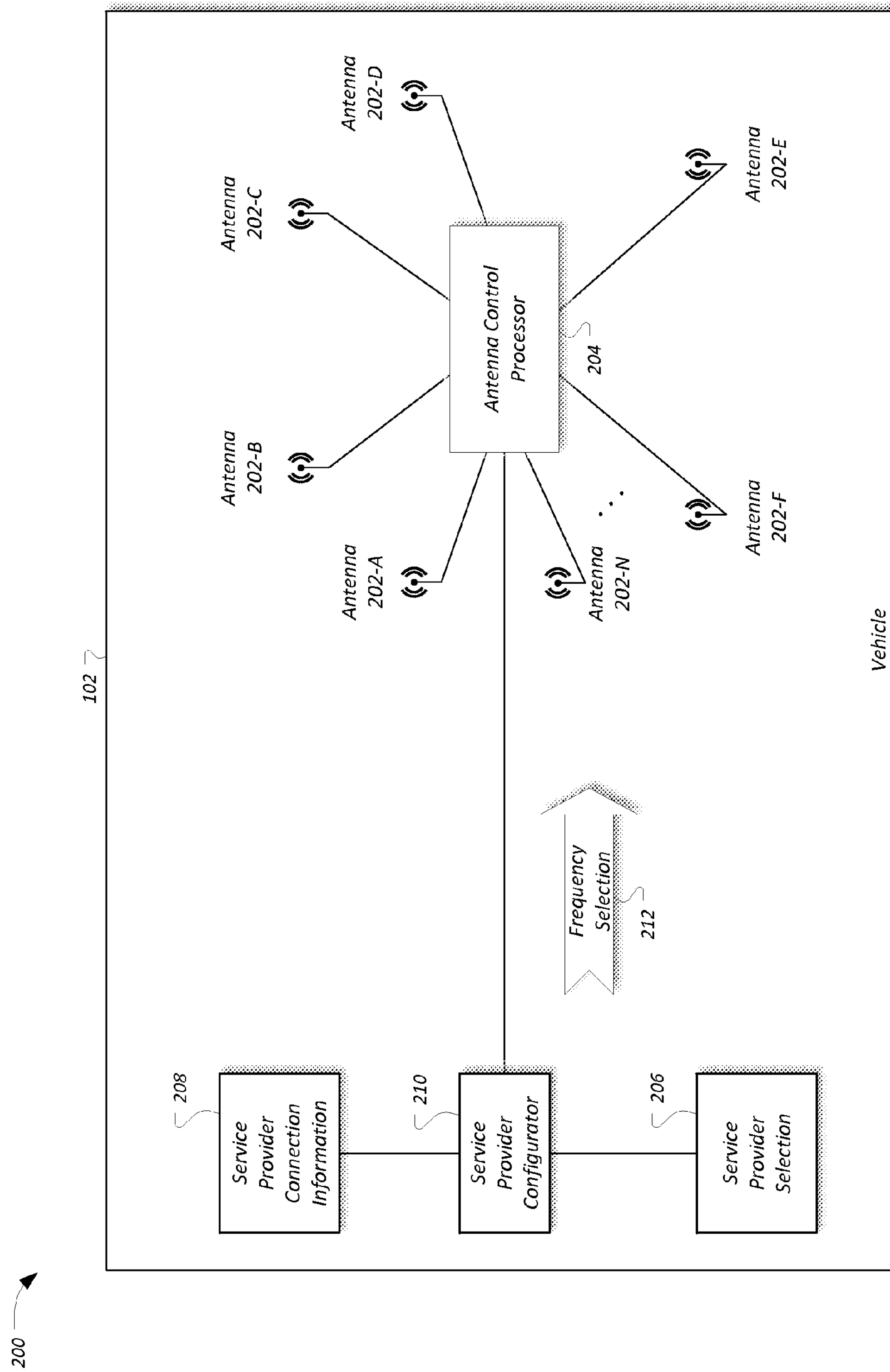
FIG. 2 illustrates a block diagram of selection of an antenna of an antenna system of the vehicle.

FIG. 2 illustrates a block diagram of selection of an antenna 202 of an antenna system 200 of the vehicle 102. As illustrated, the in-vehicle modem 144 includes a plurality of antennas 202-A through 202-N (collectively 202) connected to an antenna control processor 204. The in-vehicle modem 144 and/or computing platform 104 further includes a service provider configurator 210 configured to communicate with the antenna control processor 204 of the in-vehicle modem 144, e.g., via a vehicle bus 142 or directly. The service provider configurator 210 may utilize a service provider selection 206 and service provider connection information 208 maintained by the computing platform 104 or in-vehicle modem 144 to determine a frequency selection 212 to use to select appropriate antennas 202. The antenna control processor 204 may receive the frequency selection 212, and may select the appropriate one or more of the antennas 202 for use by the in-vehicle modem 144 to communicate over specified frequency or frequencies.

Figure 3:
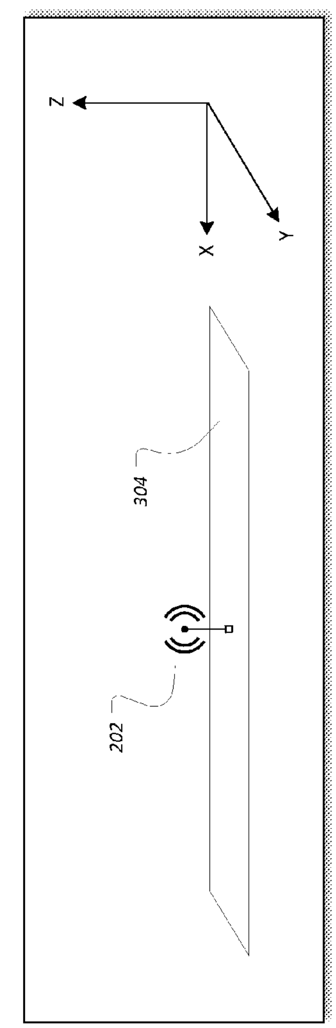
FIG. 3 illustrates an example of a quarter-wave monopole antenna mounted over a ground plane.

Desired antenna 202 bandwidth and radiation patterns may be relevant parameters when deciding upon an antenna 202 to include in the vehicle 102. For instance, many antenna 202 types have very narrow bandwidths that may be unsuitable for wideband operation. In an example, FIG. 3 illustrates an example 300 of a quarter-wave monopole antenna 202 mounted over a ground plane 304 (such as the roof of the vehicle 102), which may provide a good radiation gain pattern. However, such an antenna 202 may have a more limited bandwidth than desirable for vehicle 102 applications supporting a wide range of frequencies.

More specifically, antenna 202 bandwidth may be expressed in terms of voltage standing wave ratio (VSWR), which refers to a measure of how efficiently radio-frequency power is transmitted. For instance, an antenna 202 may be described as operating at 664-716 MHz (0.662-0.716 gigahertz (GHz)) bandwidth with a VSWR<2:1. This example antenna 202 specification implies that the reflection coefficient is less than 0.33 across the chosen frequency range quoted for the antenna 202. Hence, of the power delivered to the antenna 202, only 11% of the power would be reflected back to the transmitter. Alternatively, the return loss, or S11, may be calculated as follows: S11=20*log 10

(0.33)=−9.6 decibels (dB) (e.g., ~−10 dB). This computed return loss of −10 dB may refer to a defined level for the impedance bandwidth of an antenna 202. Therefore, a difference in the low frequency and high frequency points at which a return loss of −10 dB is achieved may accordingly define the bandwidth for the antenna 202.

Figure 4A:
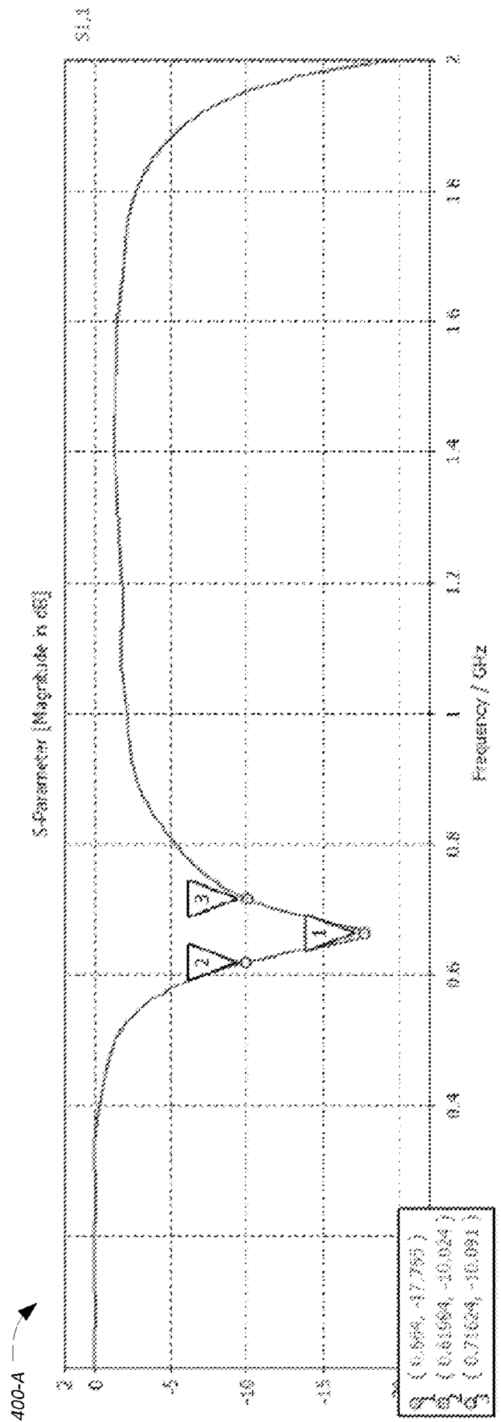
FIGS. 4A-4C each illustrates a return loss versus frequency graphs for an example antenna.
Figure 4B:
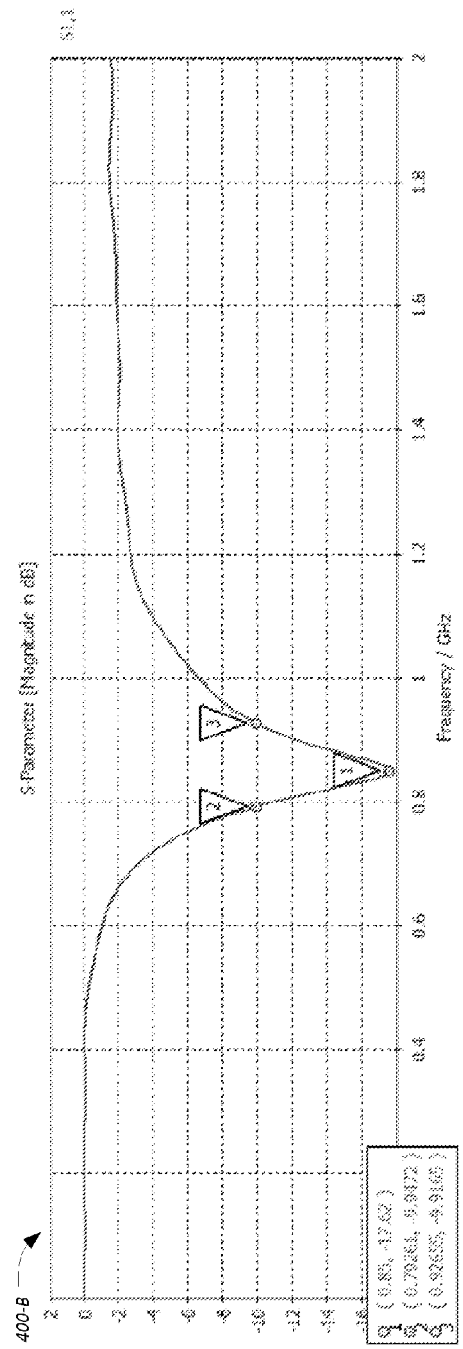
Figure 4C:
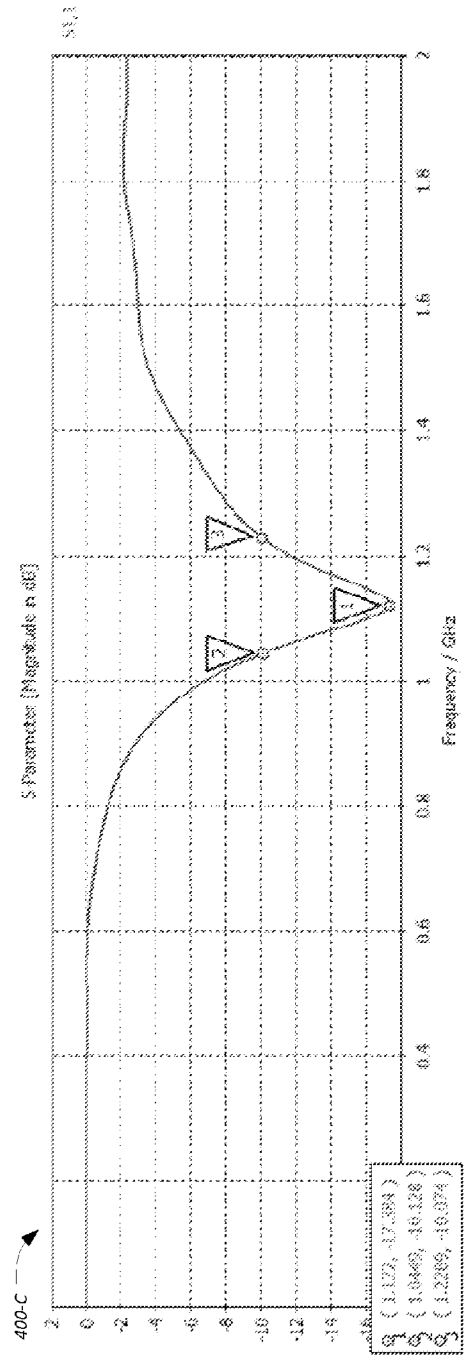

FIGS. 4A-4C each illustrates a return loss versus frequency graphs 400 (e.g., S11 parameters) for an example antenna 202. As shown in each of the FIGS. 4A-4C, the S11 parameter is represented in terms of dB, and the frequency is represented in terms of GHz. From the graphs and illustrated marked points, the impedance of the illustrated antennas 202 may be viewed and the bandwidth may be identified.

FIG. 4A illustrates a graph 400-A of an antenna 202 which is a 664 MHz monopole. As shown, the impedance bandwidth may be calculated as 0.662 (point 2)−0.71624 GHz (point 3)=0.05424 GHz or 54.24 MHz. FIG. 4B illustrates graph 400-B of an antenna 202-B which is an 850 MHz monopole. As shown, the impedance bandwidth can be calculated as 0.79261 (point 2)−0.92655 (point 3)=0.13394 GHz or 133.94 MHz. FIG. 4C illustrates graph 400-C of an antenna 202-C which is an 1122 MHz monopole. As shown, the impedance bandwidth can be calculated as 1.0449 (point 2)−1.2289 (point 3) GHz=0.184 GHz or 184 MHz.

These three examples of monopole design are each of antennas 202 that have a relatively narrow bandwidth but a good radiation pattern. There are other antenna 202 structures that can be used to cover various frequency bandwidths with various performances but no single antenna 202 structure would cover a wide bandwidth with a good return loss and radiation pattern such as what is required for the many cellular frequency bands totaling for a wide bandwidth. Moreover, it can be seen that as center frequency increases, the bandwidth of the antenna 202 also increases, which illustrates the fractional bandwidth percentage for a mentioned monopole example (Highest Frequency−Lowest Frequency)/Center frequency. Notably, such a result is also applicable to other antenna 202 types other than monopole antenna 202 structures as shown.

The in-vehicle modem 144 of the vehicle 102 may utilize multiple antennas 202 (e.g., multiple quarter-wave monopole antennas 202) to address the limited bandwidth capability of each antenna 202, while taking advantage of the good radiation pattern gains provided by such antennas 202. Referring back to FIG. 2, the in-vehicle modem 144 may utilize the antenna control processor 204 to select a desired antenna 202 from the multiple antennas 202 (e.g., the antennas 202-A through 202-N as illustrated) to cover the desired bandwidth. Accordingly, the antenna control processor 204 may be utilized to convert multiple limited bandwidth antennas 202 effectively into a single wide bandwidth antenna 202 with greater sensitivity than a single wideband antenna 202.

The service provider selection 206 may include an indication of a service provider selected by the computing platform 104 for connection by the in-vehicle modem 144. The service provider selection 206 may be based on a request from the user to connect to a particular service provider. The request may be received by the computing platform 104 in various ways, such as via a wireless communication from the user's mobile device 152 to the wireless transceiver 150 of the computing platform 104, via WiFi communication from the user's wireless device (e.g., laptop, portable music player, mobile device 152), via WiFi from the signed-up service provider, via WiFi from another service provider (e.g., on an approved list), via a cellular communication from the current service provider, or via a menu selection via the HMI of the vehicle 102 allowing the user to select a desired service provider. An example vehicle 102 HMI for selecting service provides is discussed in detail below with respect to FIG. 6.

The service provider connection information 208 may include information regarding which frequencies are associated with which service providers and for what locations. The service provider connection information 208 may further include peering information indicative of which service providers have agreements with other service providers to allow roaming onto frequencies of other service providers at locations when the service provider lacks its own service network.

The service provider configurator 210 may be configured to receive the service provider selection 206, and utilize the service provider connection information 208 to determine a frequency selection 212 to provide to the antenna control processor 204. The in-vehicle modem 144 may utilize the frequency selection 212 to indicate one of the antennas 202 of the system to be selected for use by the in-vehicle modem 144. In some cases, the service provider configurator 210 may additionally base the frequency selection 212 decision on location information for the vehicle 102. The location information may be received by the service provider configurator 210 from various sources, such as via information from the global positioning system module 146 retrieved over the vehicle bus 142, or included with the service provider selection 206 as some possibilities.

Figure 5A:
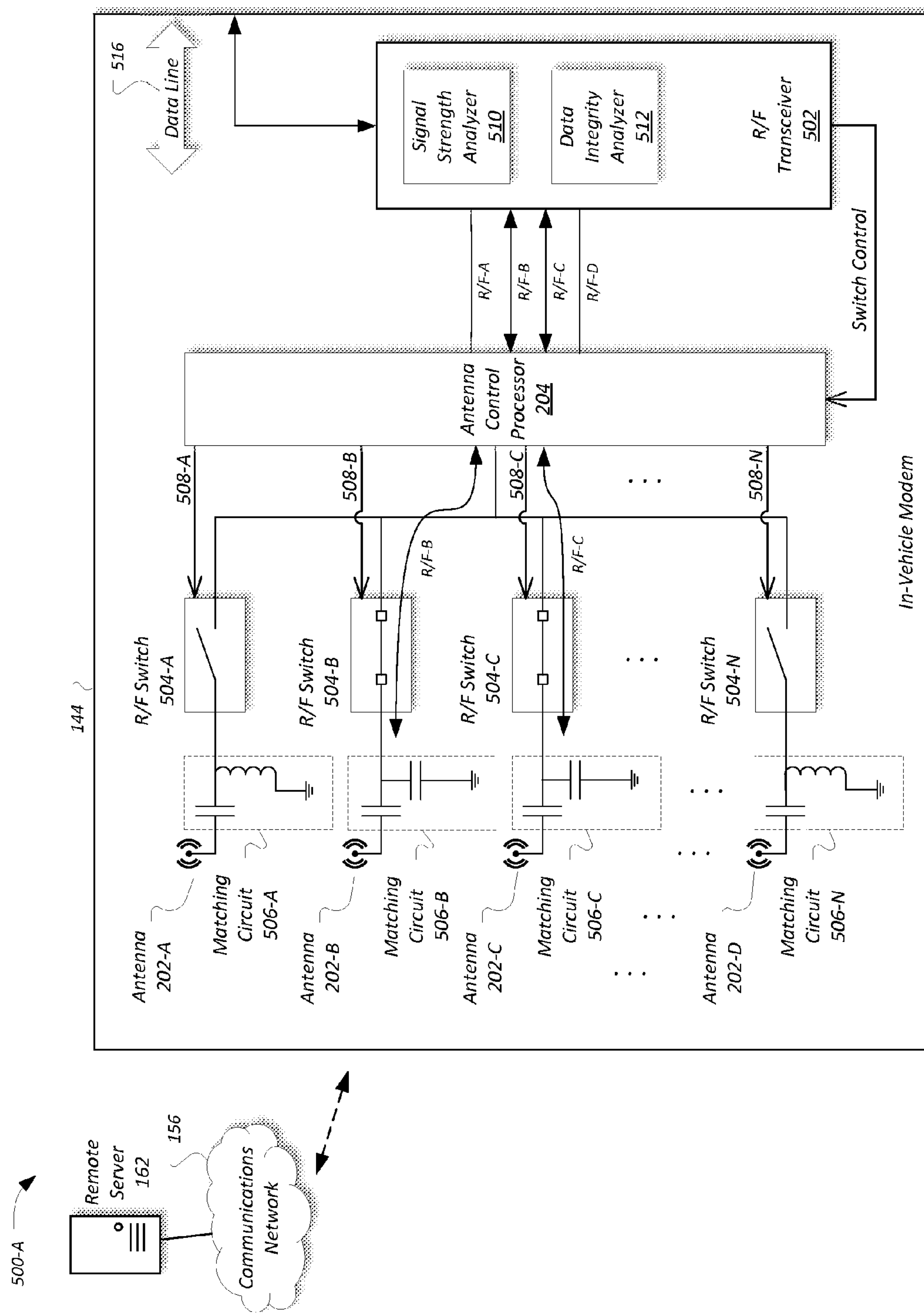
FIG. 5A illustrates a block diagram of a portion of the in-vehicle modem illustrating connection of the antenna control processor to the antennas.

FIG. 5A illustrates a block diagram 500-A of a portion of the in-vehicle modem 144 illustrating connection of the antenna control processor 204 to the antennas 202. As illustrated, the in-vehicle modem 144 includes an R/F transmitter 502 connected to the antenna control processor 204 to perform transceiver operations. Each of the illustrated plurality of antennas 202-A through 202-N (collectively 202) is connected to the antenna controller through a respective matching circuit 506-A through 506-N (collectively 506) and an radio/frequency (R/F) switch 504-A through 504-N (collectively 504). The antenna control processor 204 may connect the R/F transceiver 502 to each of the R/F switches 504, and may further provide state signals 508-A through 508-N (collectively 508) to the R/F switches 504 to enable the antenna(s) 202 indicated to be used for the vehicle 102. Accordingly, the in-vehicle modem 144 may provide a data line 516 to components of the vehicle 102 (e.g., via the vehicle bus 142) to allow those components to access the remote server 162 and other destinations on the communications network 156.

The R/F transceiver 502 may transmit and/or receive radio frequency signals between the vehicle 102 and various remote devices. To operate at particular frequencies, the R/F transmitter 502 may be connected to an antenna 202 capable of operating at those particular frequencies. When connected to the antenna 202, the R/F transceiver 502 may provide signals to the antenna 202 for transmission based on data provided to the in-vehicle modem 144. As shown, a signal R/F-B is being provided by the R/F transceiver 502 to the antenna control processor 204 to be connected to antenna 202-B, and a signal R/F-C being provided by the R/F transceiver 502 to the antenna control processor 204 to be connected to antenna 202-C. The data to be transmitted may be received by the in-vehicle modem 144 over the vehicle bus 142, in an example. When connected to the antenna 202, the R/F transceiver 502 may also receive signals from the antenna 202, decode data from the received signals, and provide the data to other vehicle 102 components, e.g., via the vehicle bus 142.

The R/F switches 504 may be configured to allow the in-vehicle modem 144 to select from the available antennas 202 for connection to the R/F transceiver 502. Each R/F switch 504 may include an R/F signal connection to a respective one of the antennas 202 and also an R/F signal connection to the antenna control processor 204 (or in other examples, to the R/F transceiver 502). Each R/F switch 504 may support a first state in which the R/F signal connection to antenna 202 and the R/F signal connection to the antenna control processor 204 (or R/F transceiver 502) are connected together, and a second state in which the R/F signal connection to antenna 202 and the R/F signal connection to the antenna control processor 204 (or R/F transceiver 502) are disconnected from one another.

Each antenna 202 may further be connected to the respective R/F switch 504 through a matching circuit 506. In many cases, the matching circuits 506 may include an L-network, which may refer to an inductor-capacitor (LC) circuit used to match impedances in R/F circuits. For some antennas 202 the matching circuit 506 may include a low-pass circuit to attenuate harmonics, noise, and other undesired signals. For other antennas 202, the matching circuit 506 may include a high-pass circuit. The specific matching circuit 506 may vary according to the antenna 202 being utilized, and may include specific capacitor and inductor values computing according to the magnitudes and relative sizes of the antenna 202 impedance and R/F transceiver 502 impedance. By providing each antenna 202 with an associated matching circuit 506, the R/F switches 504 may be able to select from the available antenna 202 without regarding potential impedance mismatches within the in-vehicle modem 144 circuit.

The R/F transceiver 502 may include a signal strength analyzer 510 configured to determine signal strength of the R/F connections from the antennas 202 to the communications network 156. In an example, the signal strength may be expressed in voltage-per-length or signal power received by a reference antenna 202. The R/F transceiver 502 may be further configured to feed through the signal strength information regarding the current antenna 202 connections to other vehicle 102 systems via the vehicle bus 142.

In some cases, there may be one antenna 202 connected during normal operation (not shown, although such operation may include one of the antennas 202 connected to the R/F transceiver 502 via the antenna control processor 204). However, in other cases such as shown in FIG. 5A, the in-vehicle modem 144 may be configured to support multiple concurrent antenna 202 connections. To do so, the R/F transceiver 502 may be configured to encode and decode multiple R/F signals, and the antenna control processor 204 may be configured to route each one of the multiple R/F signals to a unique antenna 202. For example, the antenna 202-B may be connected to an R/F-B signal of the R/F transceiver 502 by the antenna control processor 204 as shown, and the antenna 202-C may be connection to an R/F-C signal of the R/F transceiver 502 by the antenna control processor 204.

The R/F transceiver 502 may also include a data integrity analyzer 512 configured to determine capability of the R/F connection to carry data. In an example, the data integrity analyzer 512 may measure connection properties such as packet loss, number of retries, and latency. In some cases, the data integrity analyzer 512 may be configured to determine that the in-vehicle modem 144 should switch antennas 202, e.g., based on factors such as the packet loss, retries, latency and signal strength of the R/F connections from the antennas 202 to the communications network 156. As one possibility, the data integrity analyzer 512 may initiate a frequency selection 212, which may be provided to the antenna control processor 204 to switch to another antenna 202. Thus, a change in antennas 202 may be automatically initiated by the R/F transceiver 502 responsive to an identification of the signal strength being below a predetermined threshold value signal strength or based on an identification of a poor connection (e.g., packet loss or latency exceeding predetermined threshold values).

Figure 5B:
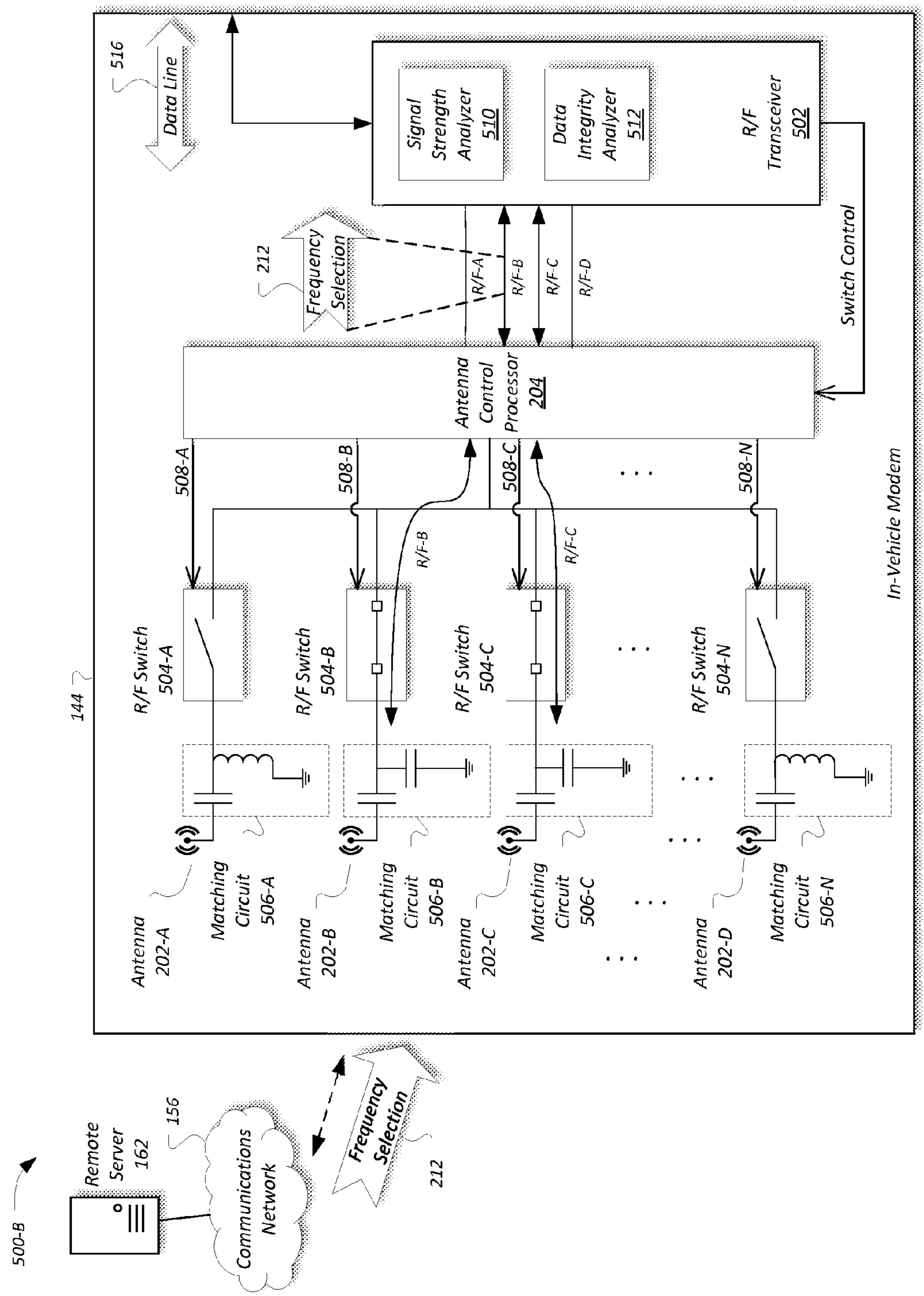
FIG. 5B illustrates a block diagram of a portion of the in-vehicle modem illustrating a request to change antennas.

FIG. 5B illustrates a block diagram 500-B of a portion of the in-vehicle modem 144 illustrating a change in antennas 202. In some cases, it may be desirable for the vehicle 102 to switch antennas 202. As mentioned above, in some cases a frequency selection 212 request may be determined by the R/F transceiver 502 according to the current properties of an antenna 202 connection. As another possibility, as shown in the diagram 500-B, the frequency selection 212 may be received from a remote server 162 over one of the antenna 202 connections to the communication network 156. In yet further cases, the frequency selection 212 may be received over the vehicle bus 142, e.g., responsive to a service provider selection 206 from an HMI screen.

In the illustrated example of diagram 500-B, the frequency selection 212 requests for the in-vehicle modem 144 to switch to connections at frequencies covered by the antennas 202-A and 202-N. Responsive to receipt of the frequency selection 212, the antenna control processor 204 may forward the frequency selection 212 to the R/F transceiver 502, which may initiate additional R/F signals (e.g., R/F-A and R/F-D as shown) and may further send a switch selection 514 to the antenna control processor 204 to connect the R/F-A signal to the antenna 202-A and the R/F-D signal to the antenna 202-N, which the antenna control processor 204 may perform via R/F switches 504-A and 504-N. In an example, the switch selection 514 may be determined by the R/F transceiver 502 according to a mapping of the R/F switches 504 to the frequencies covered by the respective antennas 202 controlled by the R/F switches 504.

Figure 5C:
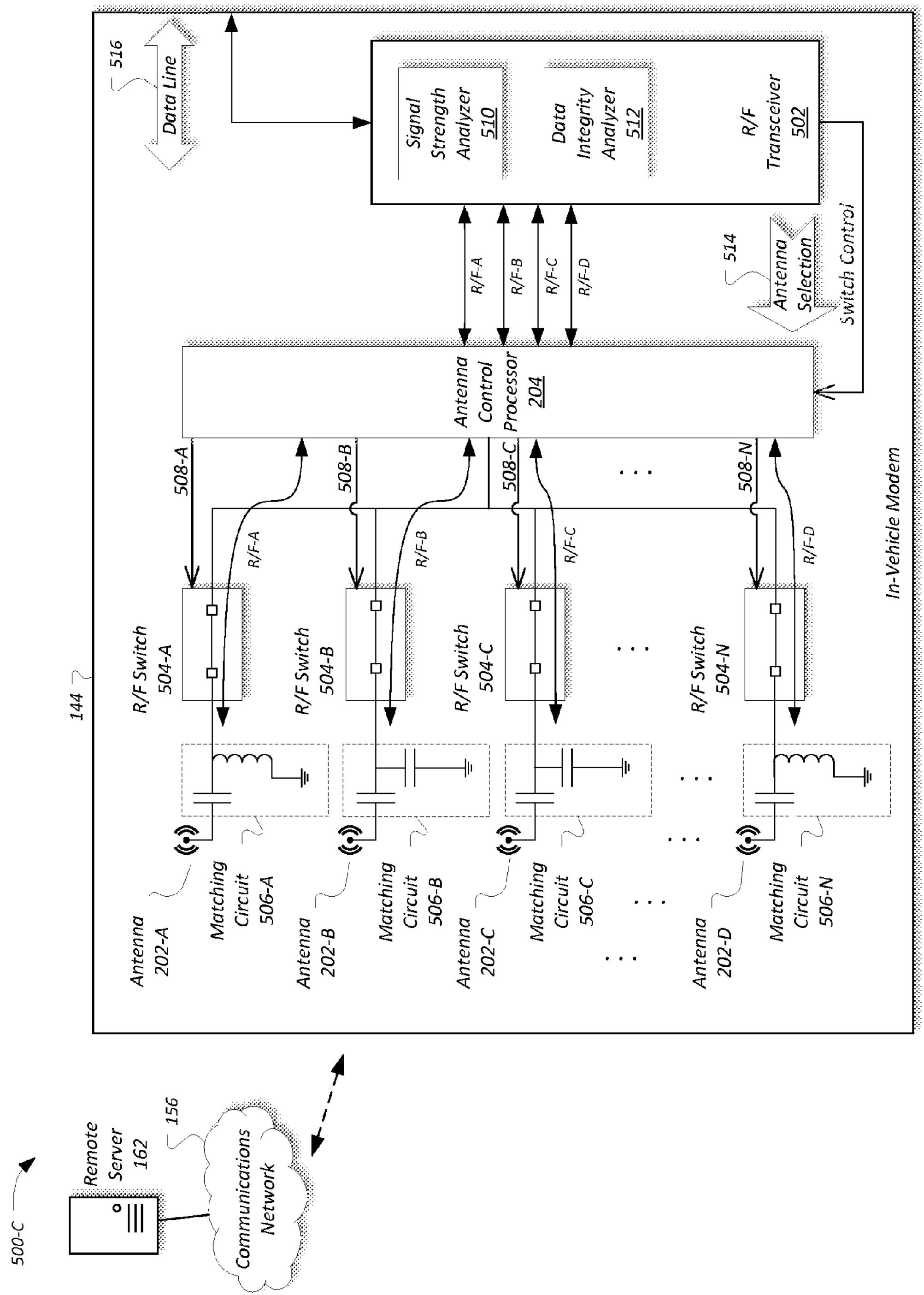
FIG. 5C illustrates a block diagram of a portion of the in-vehicle modem illustrating an intermediate state when changing antennas.

FIG. 5C illustrates a block diagram 500-C of a portion of the in-vehicle modem 144 illustrating an intermediate state when changing antennas 202. When switching the antennas 202, the in-vehicle modem 144 may be configured to first form one or more new connections, and then, once the new connection or connections are established, discontinue the old connection. This may be done to allow for the in-vehicle modem 144 to remain connected when switching antenna 202 frequencies. As a result, there may be more connections temporarily maintained during switching periods than during steady state connection conditions when switching periods are complete.

Figure 5D:
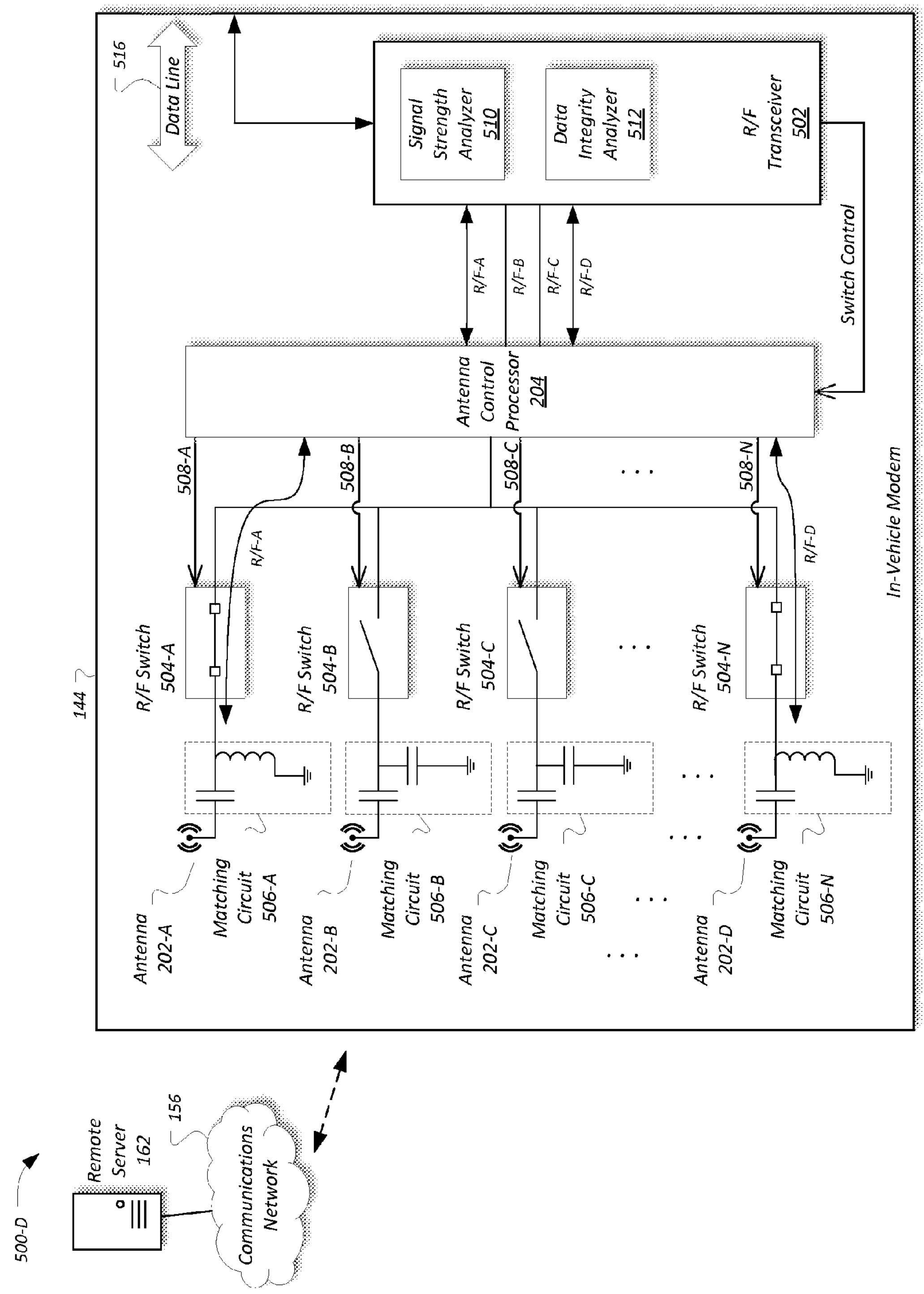
FIG. 5D illustrates a block diagram of a portion of the in-vehicle modem illustrating after completing changing antennas.

FIG. 5D illustrates a block diagram 500-D of a portion of the in-vehicle modem 144 illustrating after completing changing antennas 202. Once the R/F transceiver 502 completes handshaking via the connections over antennas 202-A and 202-N, and ensures that the signal strength is sufficient to carry the connection, the R/F transceiver 502 may discontinue the R/F-B connection over antenna 202-B and the R/F-C connection over antenna 202-C.

Figure 6:
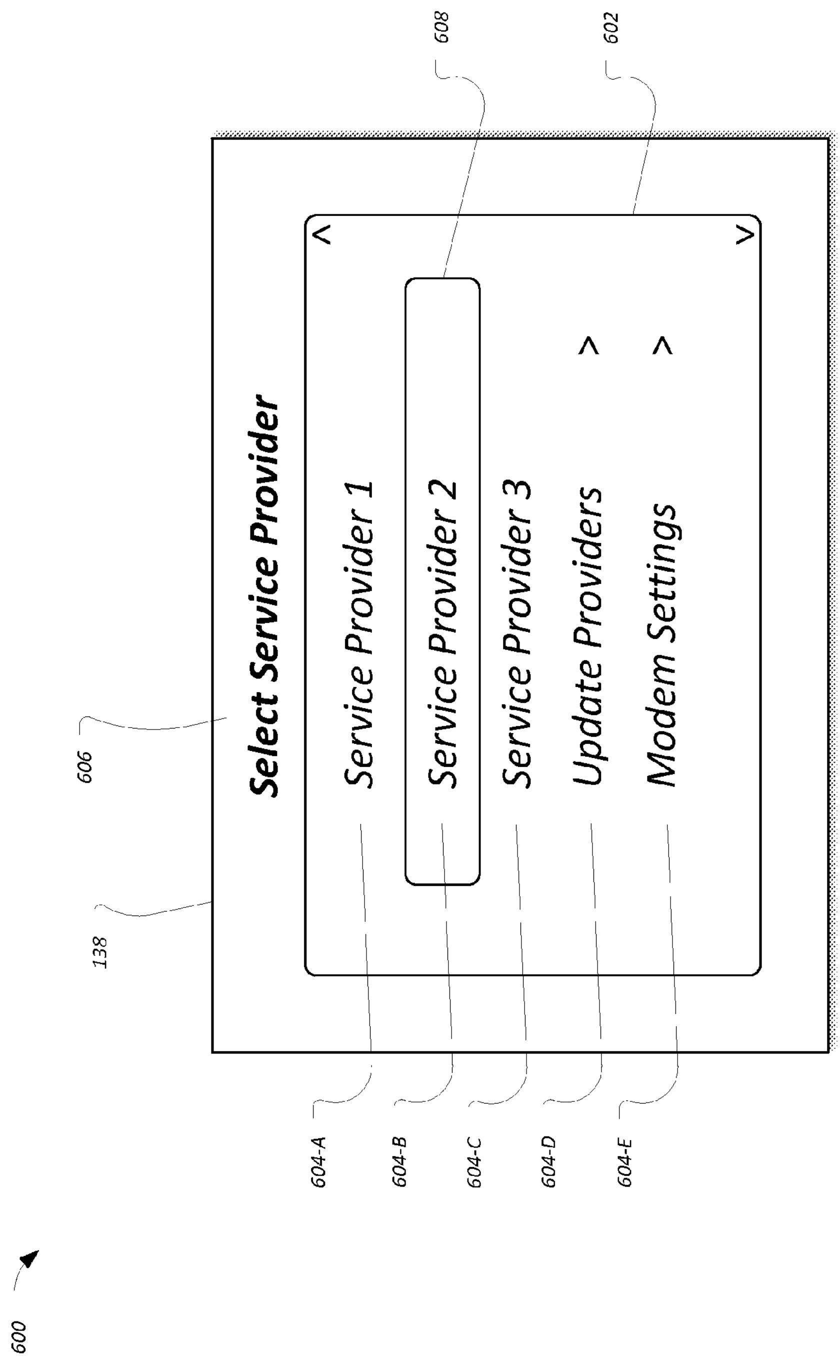
FIG. 6 illustrates an example user interface for selection of a service provider for the vehicle.

FIG. 6 illustrates an example user interface 600 for selection of a service provider for the vehicle 102. The user interface 600 may be presented in the vehicle 102 via the display 138, and may include a list control 602 configured to display selectable list entries 604-A through 604-E (collectively 604) regarding the service providers that are available for use by the computing platform 104 (or via a connected mobile device 152). (In other examples, the user interface 600 may be displayed elsewhere, such as by way of a connected application executed by the mobile device 152 paired with the computing platform 104.) The user interface 600 may also include a title label 606 to indicate to the user that the user interface 600 is for selection of a service provider for connection via the in-vehicle modem 144 of the vehicle 102.

As illustrated, the selectable list entries 604 of the connected application include an entry 604-A for a first service provider, an entry 604-B for a second service provider and an entry 604-C for a third service provider. The specific entries 604 of the list control 602 may be based, for example, on the service providers listed in the service provider connection information 208. The list control 602 may operate as a menu, such that a user of the user interface 600 may be able to scroll through list entries of the list control 602 (e.g., using up and down arrow buttons and a select button to invoke the selected entry 604). In some cases, the list control 602 may be displayed on a touch screen display 138, such that the user may be able to touch the list control 602 to select and invoke a menu item.

In an example, responsive to selection of the entry 604-B for the second service provider (e.g., via touch or the select button), the computing platform 104 may determine a service provider selection 206, and according to service provider connection information 208 may provide the frequency selection 212 to the antenna control processor 204 of the in-vehicle modem 144 to cause the in-vehicle modem 144 to select the appropriate antenna 202 for communication via the selected second service provider.

The list control 602 may further include additional entries. In an example, the "Update Providers" entry 604-D, when invoked, may be configured to cause the computing platform 104 to query a remote telematics service 162 to which the vehicle 102 has access for updated service provider connection information 208 available to the in-vehicle modem 144. As another example, the "Modem Settings" entry 304-E, when invoked, may be configured to cause the computing platform 104 to display a user interface of settings for the in-vehicle model 144 generally, such as account information and whether to enable or disable various applications or data features.

Figure 7:
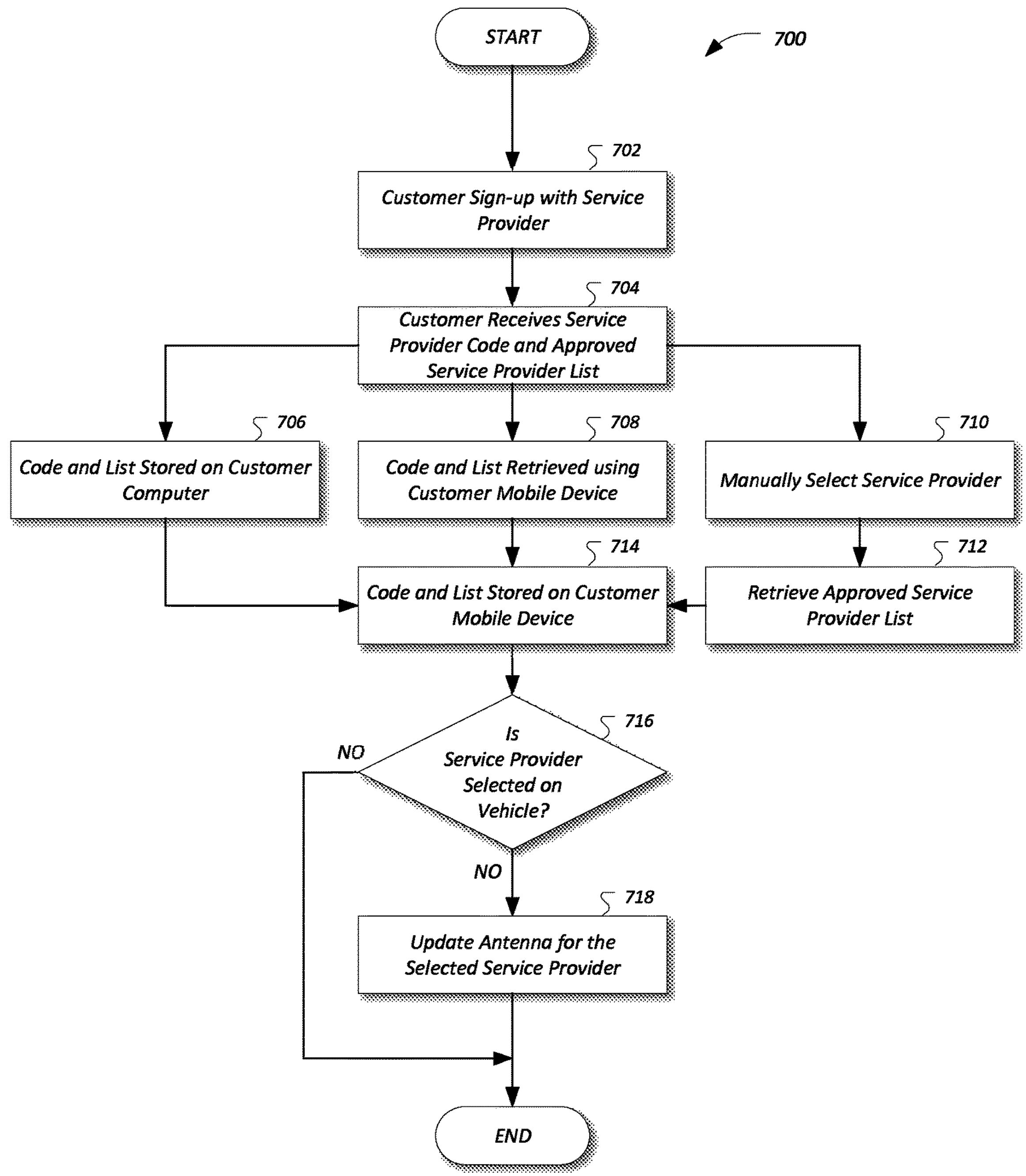
FIG. 7 illustrates an example process for selection of a service provider.

FIG. 7 illustrates an example process 700 for selection of a service provider. The process 700 may be performed, for example, by the computing platform 104 in communication with the in-vehicle modem 144.

At operation 702, the user signs up with a service provider. When signing up the user may receive a service provider code at operation 704. The service provider code may include an account identifier or other service provider connection information 208 provided by the service provider that may be used to connect the vehicle 102 to the service provider. The computing platform 104 may receive the service provider connection information 208 in various ways.

For example, at operation 706, the computing platform 104 retrieves the service provider connection information 208 as stored on the user's computer or other mobile device 152. In another example, at operation 708, the computing platform 104 retrieves the service provider connection information 208 as downloaded from a configuration service via the user's mobile device 152. In yet a further example, at operation 710 the computing platform 104 receives a manual selection of service provider via an HMI of the vehicle 102 or the mobile device 152, such as via the user interface 600 discussed in detail above, and at operation 712 further retrieves an approved service provider list.

At operation 716, the computing platform 104 determines whether the identified service provider differs from the currently selected service provider. In an example, the computing platform 104 may compare an indication of the currently selected service provider maintained by the computing platform 104 to the identified service provider. If the new service provider differs, control passes to operation 708. Otherwise, the process 700 ends.

At operation 718, the computing platform 104 updates the currently selected antenna 202 in accordance with the selected service provider. In an example, the service provider configurator 210 of the computing platform 104 may send (e.g., via the vehicle bus 142) a frequency selection 212 to the in-vehicle modem 144 based on a frequency specified for the selected service provider. The in-vehicle modem 144 may accordingly receive the selection and select the appropriate antenna 202. After operation 718, the process 700 ends.

Figure 8:
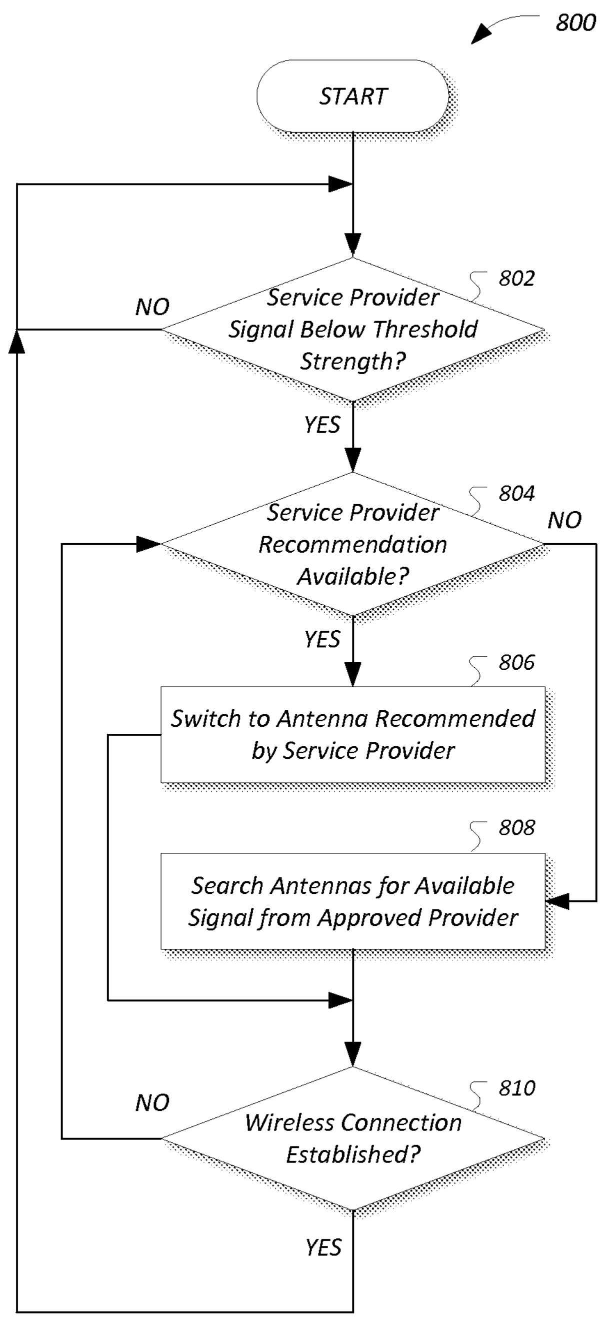
FIG. 8 illustrates an example process for updating antenna selection according to vehicle location.

FIG. 8 illustrates an example process for updating selection of an antenna 202 by the in-vehicle modem 144 according to signal strength. The process 800 may be performed, for example, by the in-vehicle modem 144. In another example, the process 800 may be performed by the computing platform 104 in communication with the in-vehicle modem 144.

At operation 802, the vehicle 102 determines whether signal strength from the connected service provider is or has fallen below a predetermined threshold strength. In an example, the computing platform 104 may receive signal strength information from in-vehicle modem 144 (e.g., via the vehicle bus 142) determined according to the signal strength analyzer 510 of the R/F transceiver 502. In another example, the R/F transceiver 502 may perform the determination of threshold strength according to the signal strength. The predetermined threshold may be, for example, no connectivity, while in other examples the predetermined threshold may include a difference between a received signal strength and a noise floor being less than a predetermine threshold amount (e.g., as determined by the data integrity analyzer 512). If signal strength is below the predetermined threshold, control passes to operation 804. Otherwise, control remains at operation 802.

At operation 804, the vehicle 102 determines whether a service provider recommendation for an alternate service provider is available. In an example, the computing platform 104 or the R/F transceiver 502 may request the in-vehicle modem 144 to send a message to the current service provider requesting an alternate service provider or frequency to use. In another example, the computing platform 104 or the R/F transceiver 502 may identify the current vehicle 102 location (e.g., via GPS), and query the service provider connection information 208 according to the current service provider and vehicle 102 location to determine whether an alternate service provider and frequency is available. If an alternate is identified based on the service provider or the service provider connection information 208, control passes to operation 806. Otherwise, control passes to operation 808.

At operation 806, the vehicle 102 switches to the antenna 202 recommended according to the service provider recommendation. In an example, the service provider configurator 210 may send a frequency selection 212 to the in-vehicle modem 144 based on the frequency specified for the recommended service provider. The in-vehicle modem 144 may accordingly determine appropriate antenna(s) 202 (e.g., as shown in FIGS. 5A-5D) and select the appropriate antenna 202.

At operation 808, the vehicle 102 searches the antennas 202 of the in-vehicle modem 144 for a signal having signal strength exceeding the threshold strength. In an example, the in-vehicle modem 144 may cycle through to a next available frequency (e.g., to the next highest or lowest frequency, or if at the maximum or minimum wrapping around to the lowest or highest, to a random frequency, etc.). For instance, the R/F transceiver 502 may send an antenna selection 514 to the antenna control processor 204 to cause the antenna control processor 204 to engage connection to the specified antenna 202. FIGS. 5A-5D illustrates an example of switching from antennas 202-B and 202-C to antennas 202-A and 202-N.

At operation 810, the vehicle 102 determines whether a wireless connection is established via the selected antenna 202. In an example, the computing platform 104 may receive state information from the in-vehicle modem 144 (e.g., via the vehicle bus 142) regarding whether connection was successful using the selected antenna 202. In another example, the R/F transceiver 502 itself may make the determination of connection, e.g., using the signal strength analyzer 510 and data integrity analyzer 512. If a wireless connection was established, control passes to operation 802. Otherwise, control passes to operation 804.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:

antennas, each associated with a different radio frequency;

a transceiver of a modem;

matching circuits that match impedance of a respective one of the antennas to the transceiver;

an antenna control processor; and

R/F switches directed by the antenna control processor to selectively connect the antennas to the transceiver, wherein the antenna control processor is configured to determine whether a service-provider-recommended alternate frequency is available, responsive to service provider signal strength received from the antennas being below a predefined signal strength; and If so, direct the modem to switch to one of the antennas associated with the alternate frequency, and otherwise, cycle to a next available antenna frequency.

2. The vehicle of claim 1, wherein the modem is further configured to:

maintain service provider connection information for service providers, including service provider identifiers and radio frequencies associated with the service providers; and utilize the service provider connection information to determine the at least one frequency associated with the desired service provider.

3. The vehicle of claim 1, wherein the modem is further configured to:

send a service provider user interface to a vehicle display; and receive an indication of the desired service provider responsive to user input to the vehicle display.

4. The vehicle of claim 1, wherein the modem is further configured to receive an indication of the desired service provider from a mobile device of a vehicle occupant.

5. The vehicle of claim 1, wherein the modem is further configured to: maintain an indication of a currently-selected service provider; and determine the alternate frequency associated with the desired service provider when the currently-selected service provider and the desired service provider differ.

6. The vehicle of claim 1, wherein the different radio frequencies associated with the plurality of antennas include at least two of: 700 megahertz (MHz), 900 MHz, 1200 MHz, 1800 MHz, 2100 MHz, and 2600 MHz.

7. A vehicle comprising:

a modem having a radio-frequency transceiver and an antenna controller;

a plurality of antennas each associated with a different radio frequency, each of the plurality of antennas connected to a matching circuit configured to match impedance of a respective antenna to the radio-frequency transceiver, each of the matching circuits connected to an R/F switch controlled by the antenna controller to connect a selected one of the plurality of antennas to the radio-frequency transceiver; and a processor configured to determine whether a service-provider-recommended alternate frequency is available, responsive to service provider signal strength being below a predefined signal strength; and if so, direct the modem to switch to an antenna associated with the alternate frequency, and otherwise, cycle to a next available antenna frequency.

8. The vehicle of claim 7, wherein the processor is further configured to utilize service provider connection information for service providers including service provider identifiers and radio frequencies associated with the service providers to determine the alternate frequency.

9. The vehicle of claim 8, wherein the service provider connection information further includes information regarding alternate radio frequencies available for user by location; and wherein the processor is further configured to utilize the service provider connection information to determine the alternate frequency according to vehicle location.

10. A computer-implemented method comprising:

determining a frequency associated with a desired service provider for communication by a modem of a vehicle via at least one selected antenna of a plurality of antennas each associated with a different radio frequency, the vehicle including a radio-frequency transceiver and an antenna control processor; and sending an antenna selection message to the antenna control processor to connect the selected antenna(s) to the radio-frequency transceiver, wherein each of the plurality of antennas is connected to a matching circuit configured to match impedance of the respective antenna to the transceiver, and each of the matching circuits is connected to an R/F switch controlled by the antenna control processor to connect a selected one of the plurality of antennas to the transceiver.

11. The method of claim 10, further comprising:

maintaining service provider connection information for service providers, including service provider identifiers and radio frequencies associated with the service providers; and utilizing the service provider connection information to determine the frequency associated with the desired service provider.

12. The method of claim 10, further comprising:

sending a service provider user interface to a vehicle display; and receiving an indication of the desired service provider responsive to user input to the vehicle display.

13. The method of claim 10, further comprising receiving an indication of the desired service provider from a mobile device of a vehicle occupant.

14. The method of claim 10, further comprising:

maintaining an indication of a currently-selected service provider; and determining the frequency associated with the desired service provider when the currently-selected service provider and the desired service provider differ.

15. The method of claim 10, wherein the different radio frequencies associated with the plurality of antennas includes at least two of: 700 megahertz (MHz), 900 MHz, 1200 MHz, 1800 MHz, 2100 MHz, and 2600 MHz.

* * * * *